US011763065B2

(12) United States Patent
Agarwal et al.

(10) Patent No.: US 11,763,065 B2
(45) Date of Patent: Sep. 19, 2023

(54) FONT FEATURE SELECTION FOR TEXT LAYOUT

(71) Applicant: Adobe Inc., San Jose, CA (US)

(72) Inventors: Rishav Agarwal, Noida (IN); Arihant Jain, Noida (IN)

(73) Assignee: Adobe Inc., San Jose, CA (US)

( * ) Notice: Subject to any disclaimer, the term of this patent is extended or adjusted under 35 U.S.C. 154(b) by 114 days.

(21) Appl. No.: 16/662,600

(22) Filed: Oct. 24, 2019

(65) Prior Publication Data

US 2021/0124869 A1 Apr. 29, 2021

(51) Int. Cl.
*G06F 40/109* (2020.01)
*G06F 40/106* (2020.01)

(52) U.S. Cl.
CPC .......... *G06F 40/109* (2020.01); *G06F 40/106* (2020.01)

(58) Field of Classification Search
CPC ....... G06F 40/19; G06F 40/106; G06F 40/109
See application file for complete search history.

(56) References Cited

U.S. PATENT DOCUMENTS

| 6,321,243 | B1* | 11/2001 | Ballard | G06F 40/109 |
| | | | | 715/202 |
| 6,948,119 | B1 | 9/2005 | Farmer et al. | |
| 7,797,624 | B2 | 9/2010 | Williamson et al. | |
| 8,306,356 | B1* | 11/2012 | Bever | G06K 9/723 |
| | | | | 382/275 |
| 9,223,757 | B2 | 12/2015 | Williamson et al. | |
| 2007/0262991 | A1* | 11/2007 | Abulhab | G06T 11/203 |
| | | | | 345/467 |
| 2011/0119573 | A1* | 5/2011 | Rudolph | G06F 40/106 |
| | | | | 715/234 |
| 2011/0289407 | A1* | 11/2011 | Naik | G06F 40/109 |
| | | | | 715/269 |
| 2012/0324348 | A1* | 12/2012 | Rounthwaite | G06F 40/103 |
| | | | | 715/256 |
| 2014/0195903 | A1* | 7/2014 | Kaasila | G06F 40/109 |
| | | | | 715/269 |
| 2016/0041899 | A1* | 2/2016 | Cragun | G06F 3/04847 |
| | | | | 714/38.1 |
| 2020/0097525 | A1* | 3/2020 | Dhanuka | G06F 3/0481 |

* cited by examiner

*Primary Examiner* — Kyle R Stork
(74) *Attorney, Agent, or Firm* — Kilpatrick Townsend & Stockton LLP

(57) ABSTRACT

This disclosure involves selecting and applying font features to improve the layout of text. For example, a computing system receives initial text. The computing system calculates an improvement metric representing a layout improvement of a font feature applied to the initial text. The font feature includes replacing a first glyph with a second glyph. The font feature, when applied to the initial text, may result in a layout improvement, which can be quantified using the improvement metric. Based on the calculated improvement metric, the computing system applies the font feature to the initial text to generate updated text. The computing system generates, for display on a display device, the updated text.

16 Claims, 9 Drawing Sheets

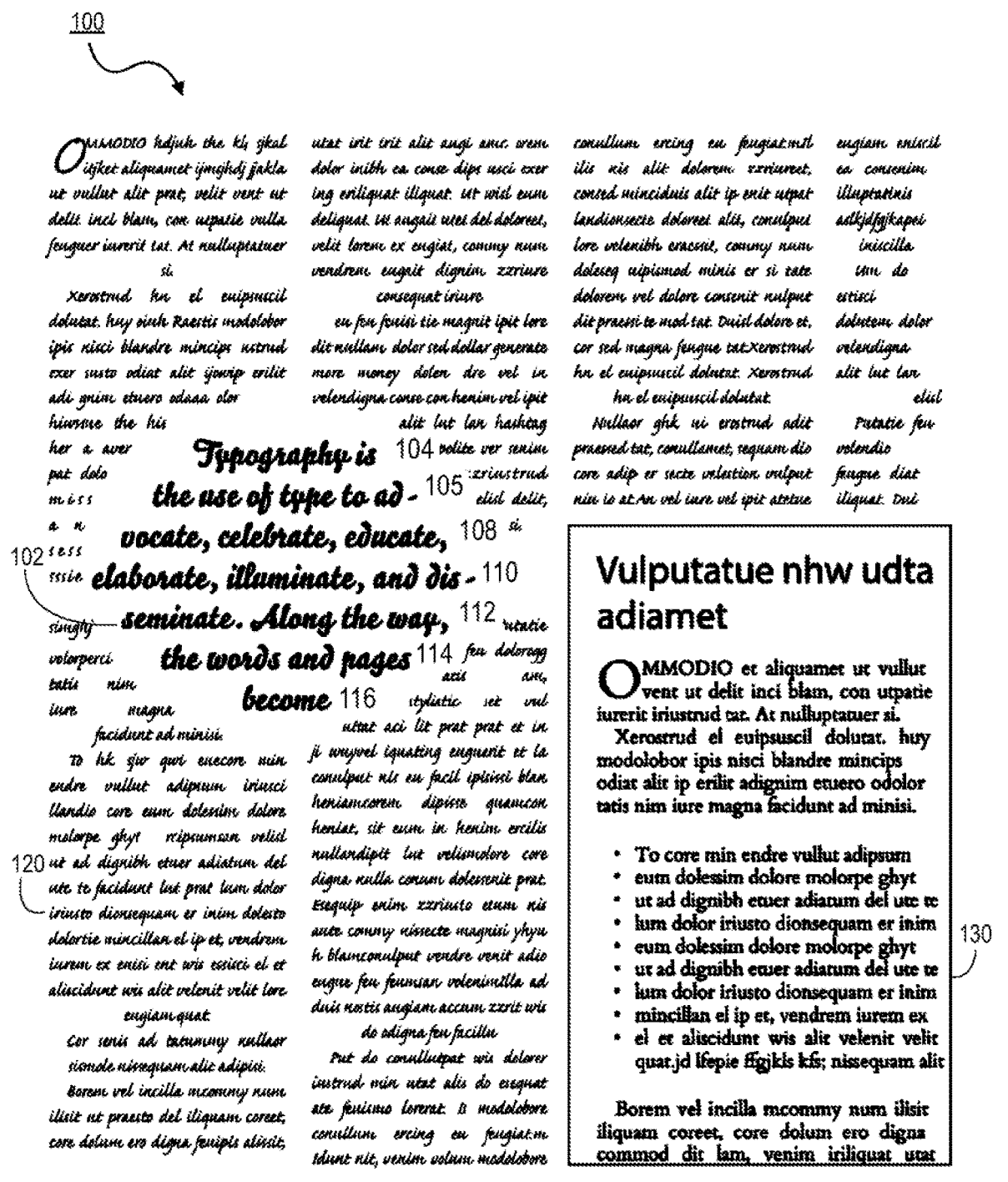

Typography is the use of type to advocate, celebrate, educate, elaborate, illuminate, and disseminate. Along the way, the words and pages become

FIG. 1A

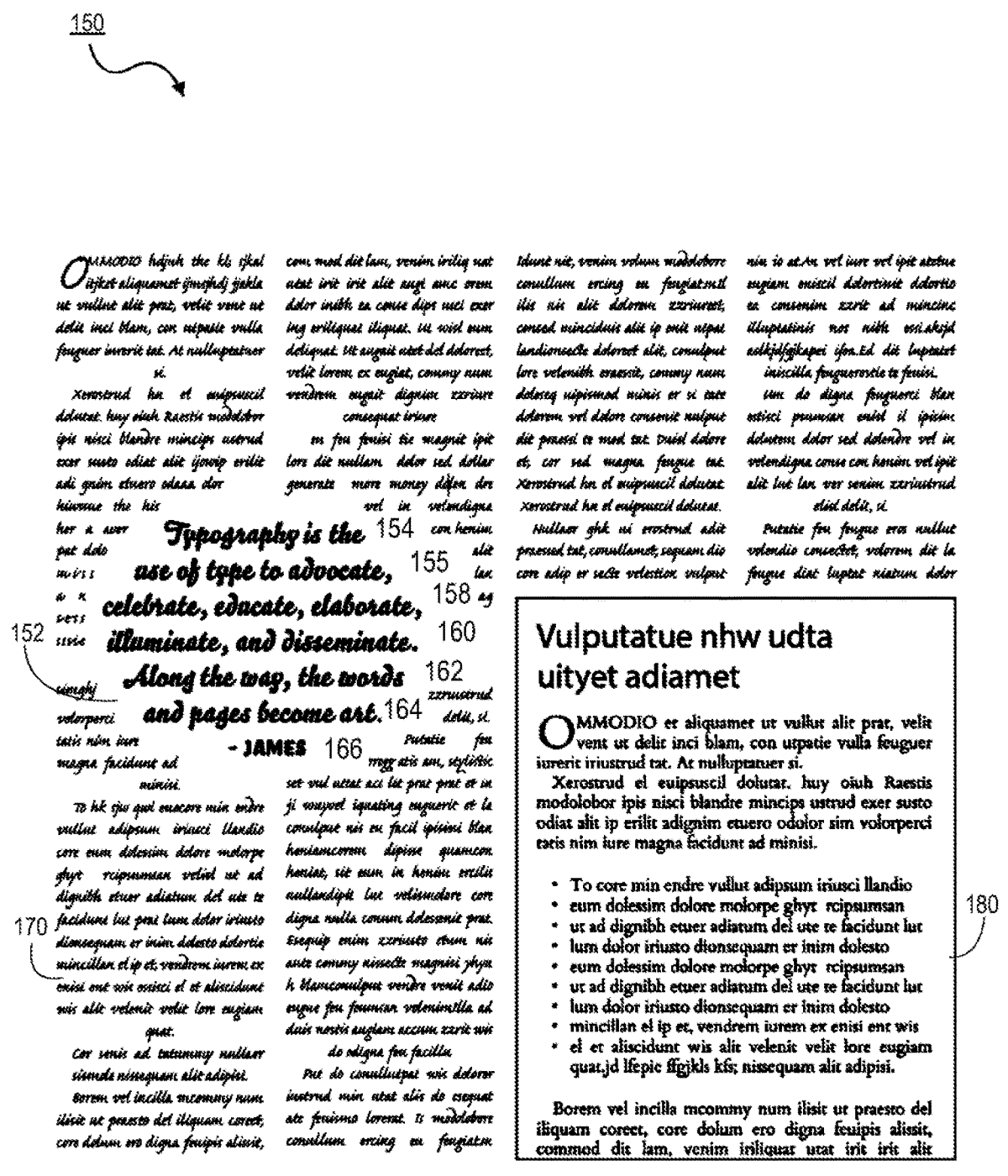

Typography is the use of type to advocate, celebrate, educate, elaborate, illuminate, and disseminate. Along the way, the words and pages become art.

— JAMES

FIG. 1B

FONT FEATURE SELECTION FOR TEXT LAYOUT

TECHNICAL FIELD

This disclosure generally relates to automated text layout. More specifically, but not by way of limitation, this disclosure relates to automatic selection and application of font features to improve the layout of text.

BACKGROUND

Digital documents are increasingly popular, and with this popularity comes an increased need to improve the visual appearance of text in such documents. The visual appearance of text is affected by the justification and alignment of lines of text. For example, generally, lines of text should have a consistent length. The visual appearance of text may further be affected by factors such as the spacing between words and characters and the presence of hyphens. While hyphens can help create lines of even length, excessive hyphenation can create a poor visual appearance.

Generally, if a text region has a poor visual appearance, such as excessive hyphenation, irregular word spacing, and irregular line lengths, it can be distracting to the user. It is particularly important for designers, such as those designing artboards for advertisements and other documents, to be able to create a visually appealing text layout. This can become quite a tedious process, particularly for documents with a large amount of text, as it can be very time consuming to manually move around each word or character in a document. Manually attempting to improve the appearance of text can also require a great deal of trial and error, making the process even more burdensome for designers.

SUMMARY

Certain embodiments involve selecting and applying font features to improve the layout of text. For example, a computing system receives initial text. The initial text may include words associated with particular fonts, word spacing, line breaks, and the like. The computing system calculates an improvement metric representing a layout improvement of a font feature applied to the initial text. The font feature includes replacing a first glyph (e.g., a letter) with a second glyph (e.g., a stylized letter). The font feature, when applied to the initial text, may modify the fonts, word spacing, line breaks, and/or the like, which may result in a layout improvement. This layout improvement can be quantified using the improvement metric. Based on the calculated improvement metric, the computing system applies the font feature to the initial text to generate updated text. The computing system generates, for display on a display device, the updated text. For example, the computing system may transmit instructions for displaying the updated text to a user device, so that a user may view the updated text. Accordingly, a user can view and assess the impact of a particular font feature on the text.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIGS. 1A-1B depict examples of text layout in a region before and after applying font features to adjust the text layout, according to certain embodiments.

DETAILED DESCRIPTION

Figure 2:
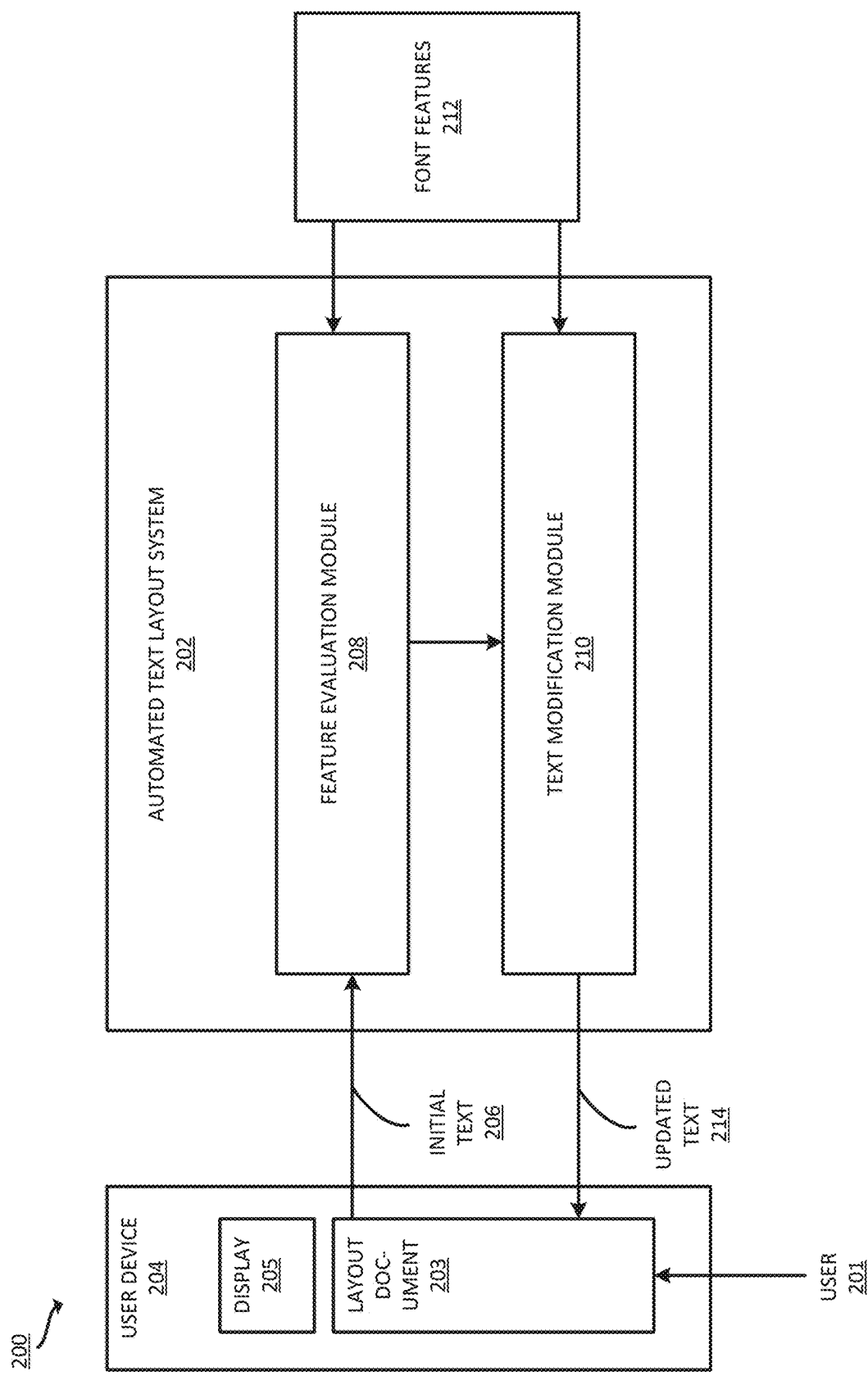
FIG. 2 depicts an example of a network environment for applying font features to improve text layout, according to certain embodiments.

The present disclosure includes systems and methods for selecting and applying font features to improve the layout of text. Certain embodiments described herein facilitate the layout of text by selecting and applying font features that further improve the appearance of a region of text. For example, penalty values, which are computed based on undesirable attributes of a text selection (e.g., uneven line lengths or excessive hyphenation), may be used to assess different potential positions for line breaks. Penalty values may be assigned to possible positions at which to break from one line to a next line, and the line breaks with the lowest penalty values may be selected and applied. Automated text layout systems described herein are used to determine how much the application of various font features will reduce the penalty value in a target text region. The font features may specify alternate glyphs and specify how the glyphs should be inserted into the text. For example, a font feature may replace selected glyphs with modified glyphs, which may change the overall spacing within a line or paragraph.

The following non-limiting example is provided to introduce certain embodiments. In this example, an automated text layout system includes one or more computing systems that execute a feature evaluation module and a text modification module. The feature evaluation module receives initial text and determines improvement metrics associated with various font features that may be applied to the initial text. The text modification module applies a font feature, based on a corresponding improvement metric. This process generates updated text for display.

For instance, a user begins designing a document by selecting a particular region of text where an improved layout is desired. Responsive to receiving this user input, the automated text layout system receives initial text corresponding to the selected region. The feature evaluation module of the automated text layout system evaluates a font feature that can be applied to the initial text. An example of a font feature is an OpenType® feature which replaces initial glyphs in the initial text with modified glyphs that combine initial glyphs. In particular, the "ligatures" OpenType® feature includes an "ffi" ligature, which corresponds to a sequence of three characters: f, f and i. By replacing the separate characters f, f and i with the ffi ligature, the spacing within the text region will be modified. The automated text layout system evaluates the application of the font feature by calculating an improvement metric. The improvement metric represents a layout improvement to the text region with the font feature applied. Such a layout improvement represents an improvement in the visual appearance of a text region. An improvement metric value may be used to differentiate visually pleasing paragraph layouts from less desirable ones. The improvement metric can be computed based on one or more of the following factors: letter size, word spacing, letter spacing, changes in word or letter format, hyphenation (e.g., excessive hyphenation may negatively affect the appearance of the text region), and paragraph consistency (e.g., similar line width in adjacent lines is preferable).

To calculate the improvement metric, the automated text layout system computes a penalty value of the initial text. The automated text layout system applies the ligature feature to the initial text, and computes a penalty value of the text with the ligature feature applied. For instance, the automated text layout system computes the improvement metric based on the two penalty values, by dividing the two to arrive at a fractional improvement metric value.

Continuing with this example, the automated text layout system calculates improvement metrics for several different available font features, to determine the font feature or combination thereof that provides the most improvement to the text layout. The automated text layout system compares the various improvement metrics and determines that OpenType® ligatures provide the greatest improvement to the initial text out of the font features available. Based on the calculated improvement metric, the text modification module of the automated text layout system applies OpenType® ligatures to the initial text, to generate updated text. The updated text has replaced several glyphs with other glyphs, i.e., ligatures that combine multiple characters. This improves the layout by condensing font in particular regions of the text and creating a more visually pleasing appearance. The automated text layout system generates the updated text for display on a display device. At this point, the user can view and evaluate the updated text.

As used herein, the term "glyph" is used to refer to a specific representation of one or more characters. Characters include letters, numbers, and punctuation marks. For a given font, a particular character, such as the letter a, may be represented via various different glyphs of different shape and style. In some cases, a glyph may represent multiple characters, such as a combined th glyph that includes the characters t and h fused together to a single glyph.

As used herein, the term "font feature" is used to refer to a feature which, when applied to text, modifies the appearance of the text. For example, a font feature may replace one or more glyphs with one or more modified glyphs. Specific examples include replacing an a glyph with an embellished a glyph with a different appearance, and replacing the glyphs t and h with a combined th glyph.

Certain embodiments provide improvements over existing software tools for automatically modifying the layout of text in an electronic document. For instance, existing automated text layout systems may select and place line breaks to produce a visually pleasing appearance within a text region that defines the space allotted for a text selection such as a paragraph. These existing techniques for text layout improvement may apply such line-breaking schemes on a line-by-line basis or by considering an overall text region, such as a paragraph. However, the improvement available through simply adjusting line breaking is limited, and may fail to adequately improve the layout in a text region. For instance, for a given text region, if restricted to apply a particular font with a fixed font size, a text layout system is limited to any improvement that line break adjustments provide. In some cases, this is not enough and still leaves much to be desired. The designers then have to resort to manually manipulating the word and letter spacing to achieve the desired effect, which can be time-consuming and tedious.

By contrast, embodiments described herein can update a text layout in accordance with particular rules that reduce or eliminate the need for subjective judgments and/or manual efforts involved in prior techniques. For instance, by assessing the impact of different font features using penalty values, as in the example described above, an automated text layout system described herein uses various rules that intelligently select from a variety of font features, rather than relying on line breaks alone. The particular rules used to automate this process can improve the operation of software tools used to edit electronic content, e.g., by reducing the manual effort associated with techniques performed with existing tools, providing improved quality of a layout as compared to the subjective efforts involved in techniques performed with existing tools, or both.

Examples of Text Layout Modification with Font Features

Referring now to the drawings, FIGS. 1A and 1B illustrate a text region before and after application of font features to improve the layout thereof. In FIG. 1A, initial text is illustrated. In FIG. 1B, updated text is illustrated.

In FIGS. 1A and 1B, each of text regions 102 and 152 define an area in which one or more lines (104-116 in FIG. 1A and 154-166 in FIG. 1B) may reside. Text regions 102 and 152 may be positioned within a page of imagery, e.g., for print reproduction such as on paper or film or electronic presentation such as on a web page.

FIG. 1A depicts an electronic document 100 including multiple text regions including text regions 102, 120, and 130. Each text region includes multiple lines of text. In text region 102, each line 104, 106, 108, 110, 112, 114, and 116 extends horizontally across text region 102. The sequence of lines 104, 106, 108, 110, 112, 114, and 116 extend vertically downward through text region 102. The height and shape of the glyphs positioned within the text region 102 may define the respective heights and/or lengths of the different lines 104, 106, 108, 110, 112, 114, and 116. For this reason, the glyphs may define both the size of lines 104, 106, 108, 110, 112, 114, and 116, and the number of lines that will fit in text region 102.

In this example, text region 102 is contained in an elliptical boundary region. In such text regions, where the boundary is not a traditional rectangular shape, it can be particularly difficult to arrange the text in a visually pleasing fashion, such as in a layout whose general shape does not significantly deviate from the text region 102. Rather than making each line approximately the same length, the lines should be in different lengths to accommodate the varying width of the elliptical region. For instance, in text region 102, line 110 should be the longest line of text in text region 102 to mimic the shape of an ellipse. Lines of text should be increasingly shorter as approaching the top and bottom of the text region, such that the shortest lines are 104 and 116.

In FIG. 1A, the text layout within the text region 102 differs from the shape of the text region, which might be considered aesthetically undesirable. For instance, the length of the lines are not configured so that the text itself has an elliptical shape, as is the desired case in an elliptical text region. Further, multiple lines are hyphenated, which reduces readability and detracts from the appearance of text region 102. Also, the entire initial text cannot fit in the elliptical region because of space constraints (i.e., a portion of the initial text is cut off).

FIG. 1B depicts an electronic document 150 including multiple text regions including text regions 152, 170, and 180. Each text region includes multiple lines of text. In text region 152, each line 154, 156, 158, 160, 162, 164, and 166 extends horizontally across text region 152. The sequence of lines 154, 156, 158, 160, 162, 164, and 166 extend vertically downward through text region 152. As is the case in FIG. 1A, the height and shape of the glyphs positioned within the text region 152 may define the respective heights and widths of the different lines 154, 156, 158, 160, 162, 164, and 166, and the glyphs may define both the size of lines 154, 156, 158, 160, 162, 164, and 166, and the number of lines that will fit in text region 152.

In FIG. 1B, text region 152 includes updated text. The initial text, as depicted in FIG. 1A, has been modified by applying a font feature to the initial text. By applying the font feature, the overall appearance of the text in text region 152 is improved, as compared to the text in text region 102 before application of the font feature. In this example, improving the overall appearance of the text involves causing the text in the text region 152 to more closely match the shape of the text region 152, as compared to the text in text region 102. In particular, the length of each line 154, 156, 158, 160, 162, 164, and 166 has been modified to give the text in the text region 152 has an elliptical shape. Further, the hyphens have been removed in the text in text region 152, creating a more aesthetically pleasing layout. Additionally, the entire initial text now fits in the elliptical region. Applying a font feature has altered the spacing in the initial text in such a way that all this became possible, without changing the point size of the font in the elliptical region.

Example of an Operating Environment for Modifying Text Layout Using Font Features FIG. 2 depicts an example of an operating environment 200 for modifying text layout using font features, according to some embodiments. In the example depicted in FIG. 2, an automated text layout system 202 modifies initial text 206 received via a user device 204. The automated text layout system 202 modifies the initial text 206 to generate updated text 214.

In FIG. 2, the automated text layout system 202 is depicted separately from the user device 204. This may be the case, for example, when the automated text layout functionality is provided as a cloud service. The automated text layout system 202 may execute on a server computer remote from the user device, and communicate with the user device 204 over a network. Alternatively, in some embodiments, the automated text layout system may execute on the user device 204 itself.

The user device 204 may be any suitable device operable by a user. The user device 204 may be, for example, a personal computer, smartphone, tablet, or the like. The user device 204 may include, or be communicatively coupled to, a display 205. Accordingly, the user device 204 is also referred to herein as a "display device." The display 205 may be a monitor, touchscreen, or the like, and may be configured to display text.

The initial text 206 may be configured by a user 201 in a layout document 203. The user 201 may, for example, be a designer. The user 201 may configure the layout document 203 by inputting initial text 206 via user device 204. Initial text 206 may correspond to one or more text regions. For example, as shown in FIG. 1A, initial text is laid out in several different columns, as well as the text box on the right hand side of FIG. 1A and the elliptical text region 102.

Initial text 206 may further be characterized by parameters such as font, size, and color. As described above with respect to FIG. 1A, the font and font size can affect the size of each glyph or character, which may impact the height and/or length of a line of text and the overall text region. Initial text 206 may further be characterized by line break placement. Line break placement may be controlled to affect the space of each line in a text region.

The automated text layout system 202 may receive initial text 206 from the user device 204. The automated text layout system may include hardware and/or software configured to automatically modify the layout of text by applying one or more font features 212 to the text. Automated text layout system 202 may further modify the layout of text by controlling line breaks, as is described in U.S. Pat. Nos. 7,797,624 B2 and 9,223,757 B2, which are hereby incorporated by reference in their entireties.

The automated text layout system 202 may include, or be communicatively coupled to, a storage device that maintains data characterizing a set of font features 212. As described above, font features 212 are features that modify the appearance of text, which may include replacing a first glyph with a second glyph. The first glyph may be replaced with a modified or stylized glyph to improve the appearance of text. Alternatively, or additionally, two or more glyphs may be replaced with another glyph, which may serve to both improve the appearance of text and alter the amount of space taken up by the corresponding characters. Examples of a font feature 212 include OpenType® features. Specific examples of font features 212 are shown in, and described in further detail below with respect to, FIG. 4.

The automated text layout system 202 includes a feature evaluation module 208. The feature evaluation module 208 may include software and/or hardware for evaluating how much a particular font feature 212 will improve the layout of a text region. The feature evaluation module 208 may receive initial text. The feature evaluation module 208 may compute a penalty value of the initial text. As described in further detail below with respect to FIG. 5, a penalty value can be used as a measure of how visually appealing the layout of a given text region is, and can be computed by incrementing the penalty value based on the presence of different problematic elements such as hyphens or uneven line lengths. The feature evaluation module 208 may further compute a penalty value of text with a font feature applied. The feature evaluation module 208 may compare the penalty value for a given text region with the font feature applied to the penalty value for the initial text in the text region, to arrive at an improvement metric which indicates how much of an improvement in the layout appearance the application of the font feature can provide.

The automated text layout system 202 includes a text modification module 210. The text modification module 210 may include software and/or hardware for applying selected font feature(s) 212 to initial text 206, to generate updated text 214. The text modification module 210 may include functionality to select a font feature 212 to apply, which may involve identifying information such as an improvement metric retrieved from the feature evaluation module 208. For example, the feature evaluation module 208 may compute improvement metrics for two or more font features 212, and transmit the improvement metrics to the text modification module 210. The text modification module 210 may select the font feature with the highest improvement metric to apply to the text. The text modification module 210 may apply a selected font feature by modifying one or more glyphs in the initial text 206. Alternatively, the text modification module 210 may receive a selected font feature via user input, as described below with respect to FIGS. 6 and 7. The text modification module 210 may further include functionality to generate the updated text 214 for display on the user device 204, e.g., by rendering the updated text 214 and/or transmitting the updated text 214 to the user device 204 for display.

Example of Operations for Modifying Text Layout Using Font Features

Figure 3:
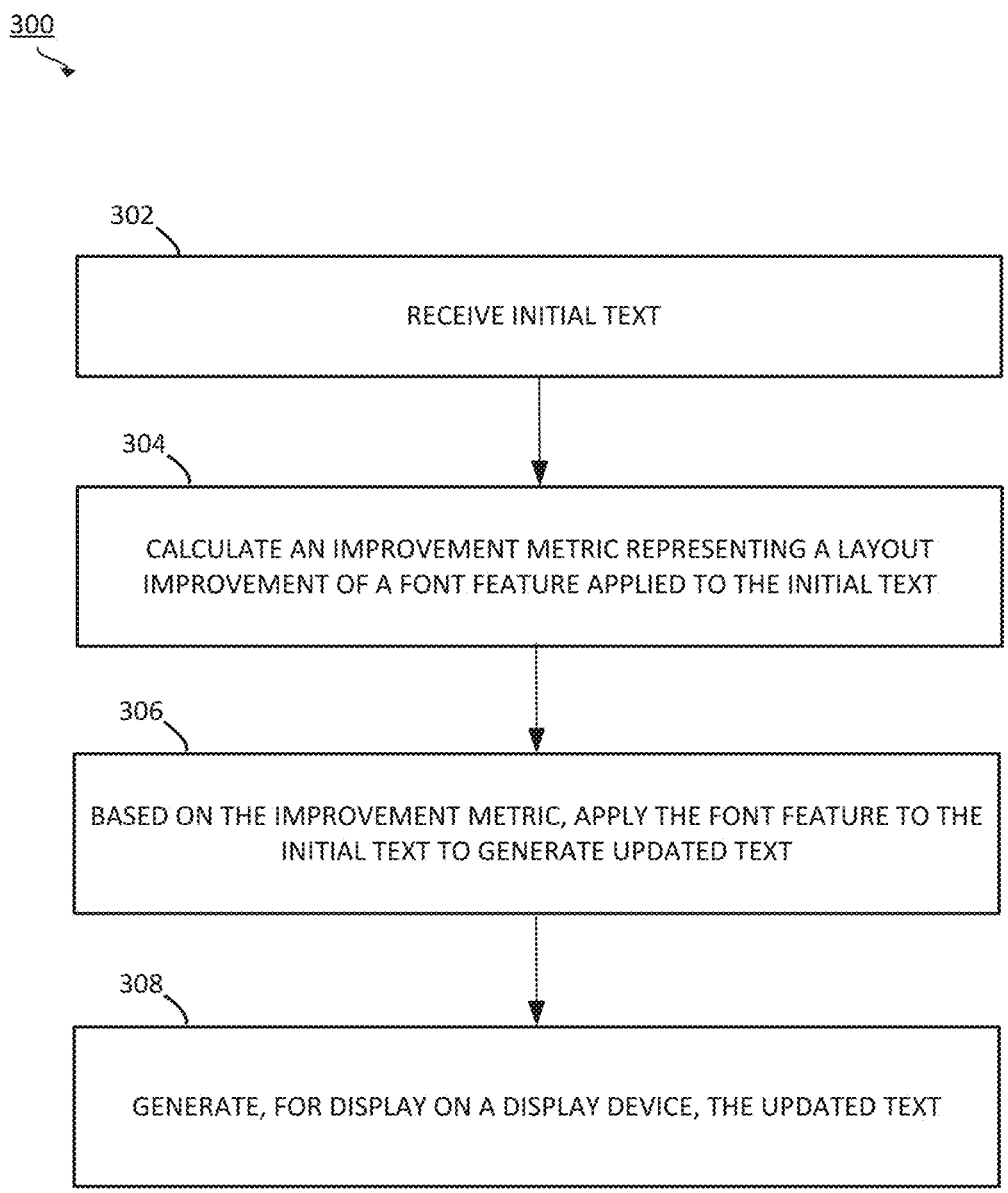
FIG. 3 depicts an example of a process for applying font features to improve text layout, according to certain embodiments.

FIG. 3 depicts a simplified flowchart 300 of a method for modifying text layout using font features, according to certain embodiments. The processing depicted in FIG. 3 may be implemented in software only (e.g., code, instructions, program) executed by one or more processing units (e.g., processors, cores) of the respective systems, in hardware, or combinations thereof. The software may be stored on a non-transitory storage medium (e.g., on a memory device). The method presented in FIG. 3 and described below is intended to be illustrative and non-limiting. Although FIG. 3 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 2, the processing depicted in FIG. 3 may be performed by an automated text layout system in cooperation with other elements of a distributed system, as illustrated FIG. 2.

Before the processing depicted in FIG. 3, a user may have configured initial text in a document on a user device. The initial text may correspond to all of, or a subset of, text included in the document. For example, the initial text may correspond to a paragraph and/or an area such as text region 102 illustrated in FIG. 1A. In some embodiments, the initial text is selected for improvement by the user. For example, the user may highlight a paragraph and interact with an interface element labeled "Improve Layout." Alternatively, or additionally, the initial text may be automatically selected for improvement. For example, the automated text layout system may automatically calculate penalty values for various text regions in a document, as described below with respect to FIG. 5, and identify initial text with a high penalty value. The selected initial text may be transmitted from the user device to the automated text layout system.

At block 302, the automated text layout system receives the initial text. The automated text layout system may receive the initial text over a network via a wired or wireless connection. For example, the automated text layout system may receive the initial text via an exposed Application Programming Interface (API). Alternatively, in some embodiments, the automated text layout system may execute on the user device, e.g., within a same layout application used to generate the initial text, in which case the text layout may be transmitted between modules executing on the user device.

At block 304, the automated text layout system calculates an improvement metric representing a layout improvement of a font feature applied to the initial text. Examples of font features are shown in, and described below with respect to, FIG. 4. The improvement metric may be computed based on computing and comparing penalty values for (a) the initial text and (b) the text with the font feature applied, as described in detail below with respect to FIG. 5.

Figure 4:
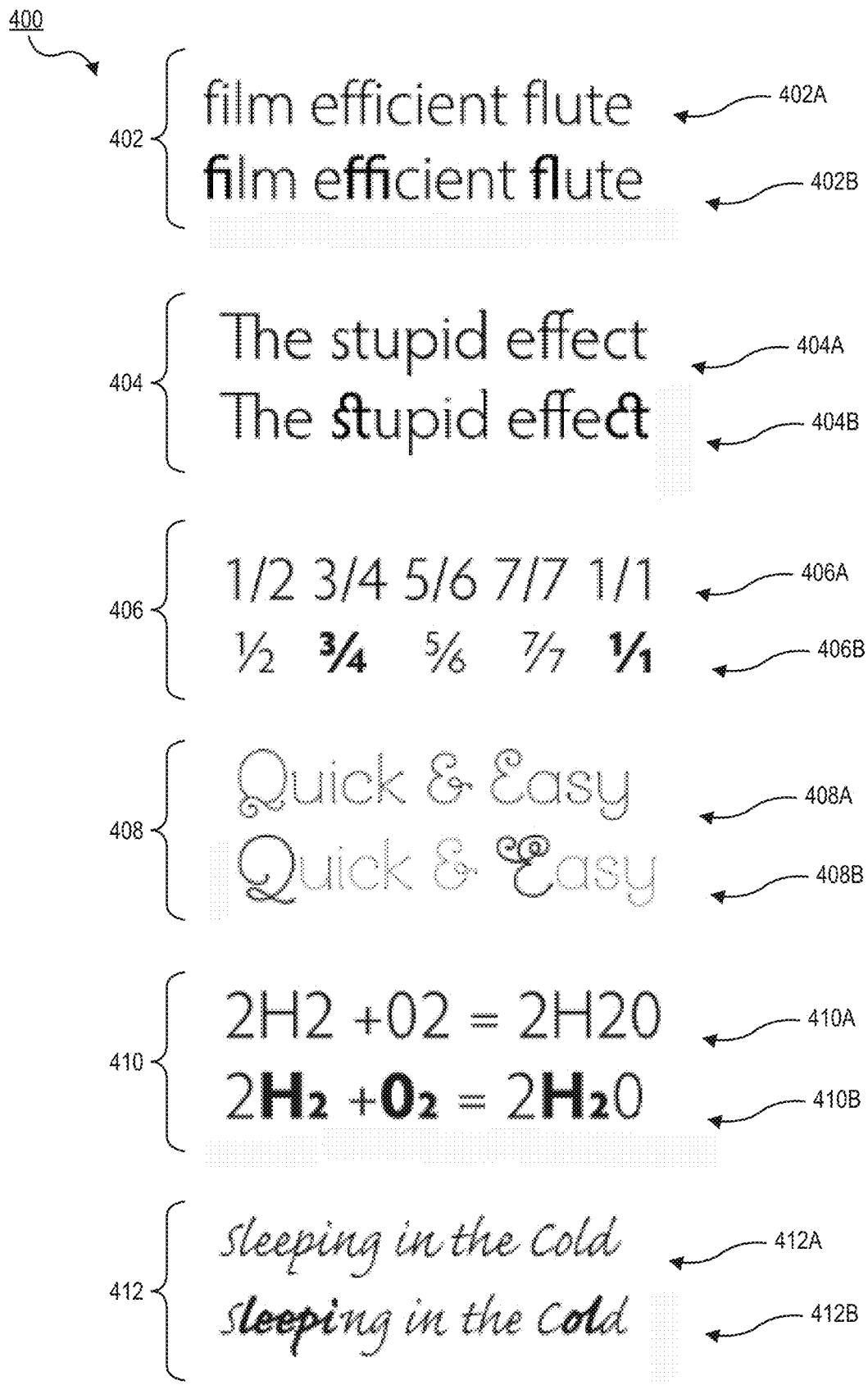
FIG. 4 depicts an example of various font features which may be applied to improve text layout.

At block 306, based on the improvement metric, the automated text layout system applies the font feature to the initial text to generate updated text. In some embodiments, the automated text layout system may calculate multiple improvement metrics at block 304, and may select a font feature corresponding to the improvement metric representing the largest improvement to the text layout. Alternatively, the automated text layout system may apply an improvement metric to the text if the improvement metric exceeds a threshold value. For example, the improvement metrics are measured in percent improvement, where 0% is no improvement over the initial text and 100% improvement is a 2× improvement over the initial text. The threshold value may be set to 40%, and if the improvement metric is at least 40%, then the corresponding font feature is applied to the initial text. The automated text layout system may apply the font feature by modifying the text. Applying the font feature to the initial text may involve replacing one or more glyphs with one or more other glyphs, as illustrated in FIG. 4.

In some embodiments, the automated text layout system may execute additional operations to modify the initial text. As an example, the automated text layout system may apply multiple font features to the text in turn. As another example, the automated text layout system may additionally modify other parameters of a text region such as line breaking, character spacing, word spacing, the spaces between lines, and so forth.

At block 308, the automated text layout system generates, for display on a display device, the updated text. Generating the updated text for display on a display device may include rendering the updated text for display. Alternatively, or additionally, generating the updated text for display on the display device may include transmitting the updated text to the display device. The display device may then display the updated text to the user.

Examples of Font Features

FIG. 4 illustrates examples of several different font features 400, according to some embodiments. FIG. 4 depicts initial text 402A-412A, and corresponding updated 402B-412B, upon application of different font features 402-412.

Font feature 402 is a ligature. Ligatures modify awkward combinations of letters, such as fi, ffi, and fb. When applied, font feature 402 replaces one or more glyphs (e.g., f and i) with another glyph (e.g., fi combined into a single glyph). This is shown by comparing the glyphs in initial text 402A with the glyphs in the updated text 402B, where fi; ffi; and fl have been combined into respective single glyphs.

Font feature 404 is a discretionary ligature. Discretionary ligatures are similar to the ligatures font feature 402, but include a different set of glyphs. When applied, font feature 404 replaces one or more glyphs (e.g., s and t) with another glyph (e.g., st combined into a single glyph). This is shown by comparing the glyphs in initial text 404A with the glyphs in the updated text 404B, where st and ct have been combined into respective single glyphs.

Font feature 406 is a modified fraction. Modified fractions use diagonal fractions. When applied, font feature 406 replaces one or more glyphs (e.g., 1, /, and 2) with another glyph (e.g., 1/2 combined into a single glyph). This is shown by comparing the glyphs in initial text 406A with the glyphs in the updated text 406B, where 1/2; 3/4; 5/6; 7/7; and 1/1 have been combined into respective single glyphs.

Font feature 408 is a swash. Swashes are characters with an ornamental effect. When applied, font feature 408 replaces a glyph (e.g., Q) with another glyph (e.g., a Q with an ornamental effect). This is shown by comparing the glyphs in initial text 408A with the corresponding glyphs in the updated text 408B, where Q and E have been replaced with respective ornamented glyphs.

Font feature 410 is ordinals. Ordinals use superscripted or subscripted numbers or letters. When applied, font feature 410 replaces one or more glyphs (e.g., 2) with another glyph (e.g., a subscripted 2). This is shown by comparing the glyphs in initial text 410A with the glyphs in the updated text 410B, where 2 has been replaced in several instances with a subscripted 2.

Font feature 412 is a contextual ligature. Contextual ligatures are another variation on the ligature. Contextual ligatures help to give words a slightly more animated and informal appearance and to lend more visual interest to type composition. When applied, font feature 412 replaces one or more glyphs (e.g., o and l) with another glyph (e.g., a combined ol glyph). This is shown by comparing the glyphs in initial text 412A with the glyphs in the updated text 412B, where leepi and ol have been replaced with respective modified glyphs.

Example of Operations for Calculating an Improvement Metric

Figure 5:
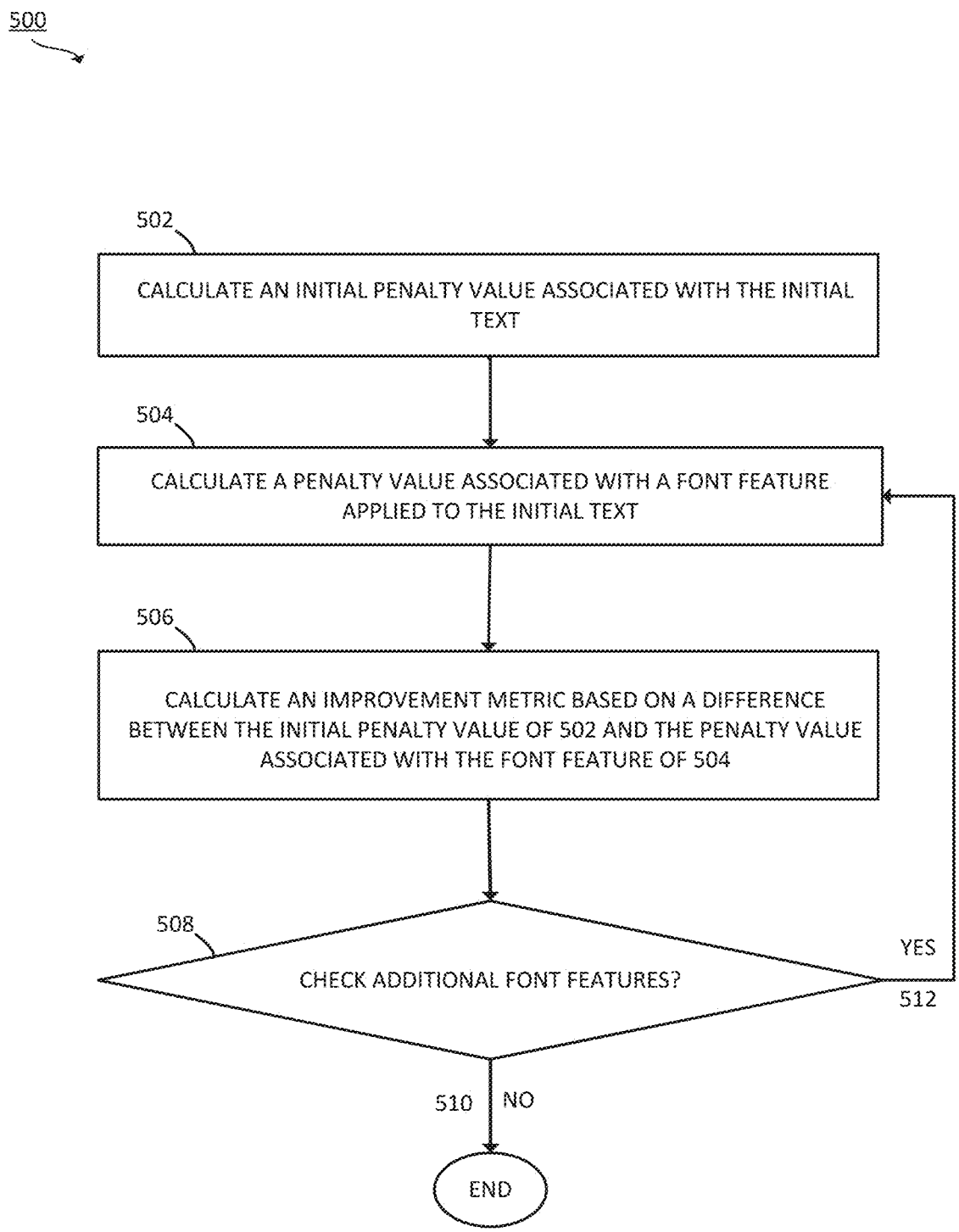
FIG. 5 depicts an example of a process for calculating the improvement metric of FIG. 3, according to certain embodiments.

FIG. 5 depicts a simplified flowchart 500 depicting a method for calculating an improvement metric (e.g., at block 304 of FIG. 3), according to certain embodiments. The processing depicted in FIG. 5 may be implemented in software only (e.g., code, instructions, program) executed by one or more processing units (e.g., processors, cores) of the respective systems, in hardware, or combinations thereof. The software may be stored on a non-transitory storage medium (e.g., on a memory device). The method presented in FIG. 5 and described below is intended to be illustrative and non-limiting. Although FIG. 5 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 2, the processing depicted in FIG. 5 may be performed by the feature evaluation module of the automated text layout system illustrated FIG. 2.

At block 502, the feature evaluation module calculates an initial penalty value associated with the initial text. Penalty values can be calculated and used to differentiate visually pleasing text layouts from less desirable ones. In some embodiments, the penalty value increases with the number of elements that are not deemed visually pleasing—the higher the penalty value, the more room for improvement. Penalty values may be calculated, for example, on a per-line basis, a per-paragraph basis, or a per-section basis.

A penalty value may take a number of factors into consideration. For instance, a penalty value may take into account factors such as letter size, word spacing, letter spacing, changes in word or letter format, and hyphenation. In addition, paragraph consistency may affect a penalty value. For instance, an increased penalty value may be assigned to a line with narrow word spacing if it immediately follows a line with wide word spacing.

Hyphenation may affect a penalty value in several different ways. For instance, a penalty value may take into account where a particular hyphenation is occurring within an individual word, assigning greater penalties to less desirable hyphenation. In addition, repetitive hyphenation within a paragraph may further increase a penalty value. Moreover, hyphenating particular words, such as the last word on a page, may increase a penalty value.

As a specific example, a line breaking algorithm may be applied that uses two factors to determine the penalty value:

1) Difference of the target width and current width of each line.

2) Number of hyphenations in each line.

In this example, the line-breaking algorithm can include a penalty calculation, such as the following formulation:

$$\text{penalty}=0.5*(\text{targetWidth}-\text{currentWidth})/\text{targetWidth}+0.05*(\text{numberOfHyphenations}).$$

In this example, the targetWidth term represents a target width for the text, which may be based on a width of a bounding region for the text, the currentWidth term represents a current width of the text, and the numberOfHyphenations term represents a number of hyphenations in the text. For target text including one line of text to fit in a box having target width of 600 millimeter (mm), if the width of the line is 500 mm, the initial value of the penalty would be:

$$\text{penalty}=0.5*100/600+0.05*0=0.0833.$$

In some embodiments, a user can customize the penalty value calculation. For example, the automated text layout system may accept user input to tune one or more constants in the penalty formula provided above (e.g., 0.5 and 0.05). By increasing or decreasing a constant, a factor (such as hyphenation, line width, and the like) will have a stronger or weaker effect on the penalty value. The automated text layout system may receive such user input via, for example, a configuration file. Alternatively, or additionally, the automated text layout system may cause a display device to present a UI screen showing different factors, such as hyphenation, consistency penalty, letter spacing, word spacing, etc. The UI screen may further include elements for incrementing or decrementing a particular constant to tune such a factor. The automated text layout system may heuristically determine one or more of constants in the penalty formula provided above, and can receive input from the user that changes these values experimentally. Alternatively, the automated text layout system may receive one or more user inputs that specify a separate algorithm that determines the constant values.

At block 504, the feature evaluation module calculates a penalty value associated with a font feature applied to the initial text. The feature evaluation module may identify a particular font feature to check. In some embodiments, the automated text layout system may evaluate multiple font features in turn, e.g., in a predetermined order. This may involve identifying a set of applicable font features (e.g., based on the language, included characters, or other characteristics of the text region of interest, a certain subset of font features may be available). Alternatively, or additionally, the feature evaluation module may evaluate a particular font feature based on input received from a user (e.g., as described further below with respect to FIG. 6). The feature evaluation module may apply a font feature to the initial text. Upon applying a font feature to the initial text, the feature evaluation module may calculate the penalty value, for the text with the font feature applied, in a similar manner as described above with respect to block 502. Application of font features may reduce the penalty value by, among other things, changing the length and size of lines in the text region.

Continuing with the above example, where $$\text{penalty}=0.5*(\text{targetWidth}-\text{currentWidth})/\text{targetWidth}+0.05*(\text{numberOfHyphenations}),$$

the Swash feature is applied, and the width becomes 575 mm. The final penalty value associated with the font feature applied to the initial text is:

$$\text{penalty}=0.5*25/600+0.05*0=0.020833.$$

At block 506, the feature evaluation module calculates an improvement metric based on a difference between the initial penalty value of block 502 and the penalty value associated with the font feature of block 504. The improvement metric represents how much of an improvement the application of the font feature provides. The improvement metric may be computed by dividing the penalty value post-font-feature application of block 504 by the initial penalty value of block 502. As another example, the improvement metric may be computed by subtracting the penalty value post-font-feature application of block 504 from the initial penalty value of block 502. As another example, a percentage improvement may be computed by setting the improvement metric to $100(P_I-P_{FF})/P_I$, where $P_{FF}$ is the penalty value post-font-feature application of block 504 and $P_I$ is the initial penalty value of block 502.

Continuing with the above example, where penalty=0.5*(targetWidth−currentWidth)/targetWidth+0.05*(numberOfHyphenations), the improvement metric is computed as a percentage difference between the initial penalty value (penaltyInitial) and the final penalty value (penaltyFinal):

((penaltyInitial−penaltyFinal)/penaltyInitial)*100.

In the current example, the percentage difference is ((0.0833−0.020833)/0.0833*100)=75%. This indicates that the font feature will improve the layout by 75%.

At block 508, the feature evaluation module may determine whether additional font features should be checked. For example, if the feature evaluation module is checking multiple font features, then a determination may be made which font features have already undergone blocks 504 and 506. The feature evaluation module may compare font features for which improvement metrics have been computed to a list of available font features, and determine whether or not remaining font features should be checked. As another example, the feature evaluation module may simply determine that only one font feature has been selected, and determine that no additional font features should be checked.

If no additional font features should be checked, then, at block 510, the flow proceeds to block 510 and ends. The feature evaluation module may transmit one or more computed improvement metrics to the text modification module to apply font feature(s) based on the improvement metric(s).

If additional font feature(s) should be checked, then, at block 512, the flow proceeds to block 504. The feature evaluation module may iteratively repeat blocks 504-508 until all applicable font features have been checked.

Alternatively, or additionally, an improvement metric may be calculated based on a combination of multiple font features. For example, the feature evaluation module may compute a penalty value of initial text at 502. At 504, the feature evaluation module may apply two or more font features, and calculate a resulting penalty value. At 506, the feature evaluation module can compute the improvement metric based on the cumulative effect of two or more font features. As a specific example, applying a combination of Ligatures and Swashes could reduce the penalty value by 70% whereas individually Ligatures would reduce the penalty value by 30% and Swashes would reduce the penalty value by 20%. The feature evaluation module may then apply two or more font features to the initial text to generate updated text at block 306 of FIG. 3.

Example of Operations for Configuring Font Features Via User Interface

Figure 6:
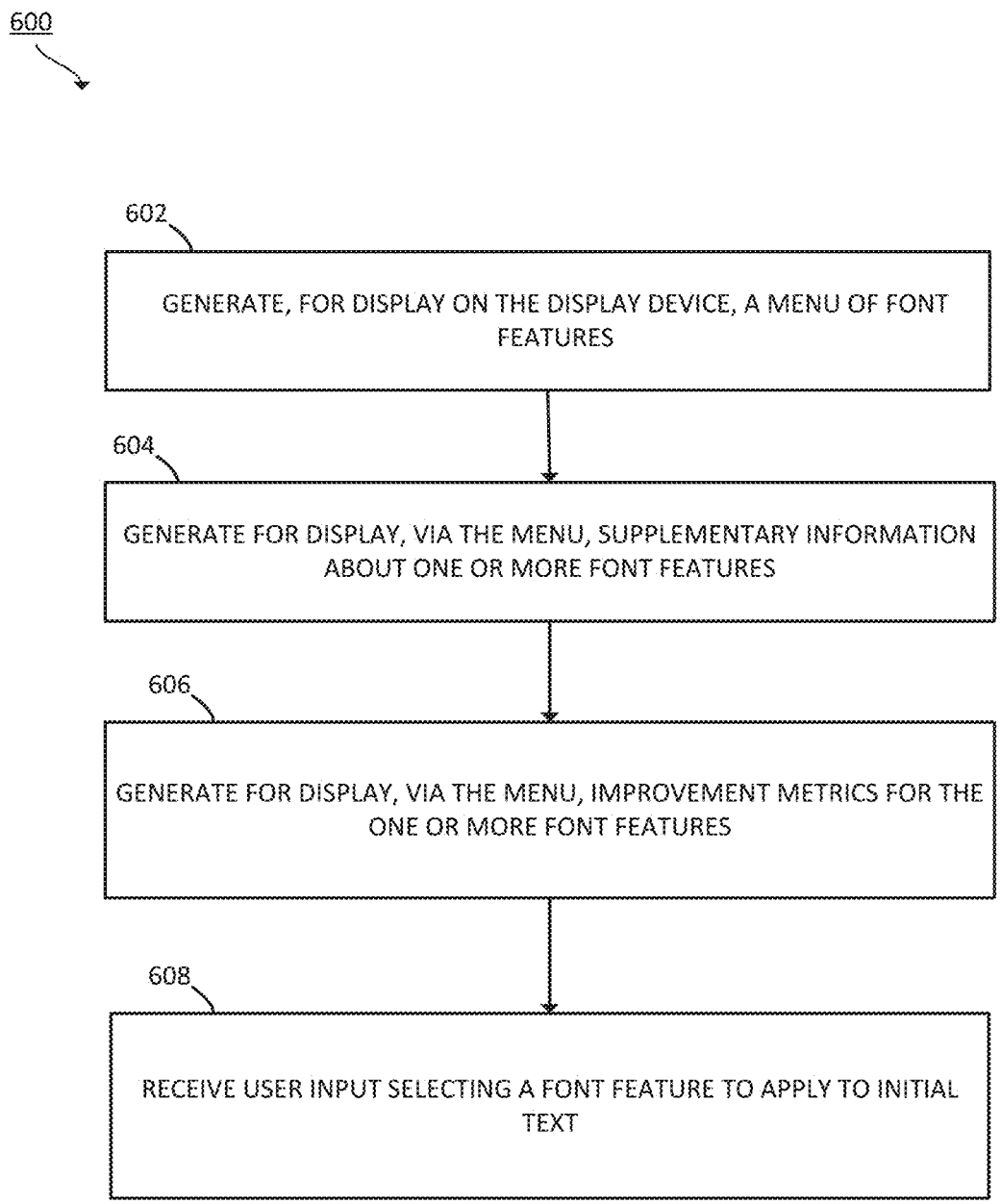
FIG. 6 depicts an example of a process for configuring font features via a user interface, according to certain embodiments.

FIG. 6 depicts a simplified flowchart 600 depicting a method for configuring font features via a user interface, according to certain embodiments. The processing depicted in FIG. 6 may be implemented in software only (e.g., code, instructions, program) executed by one or more processing units (e.g., processors, cores) of the respective systems, in hardware, or combinations thereof. The software may be stored on a non-transitory storage medium (e.g., on a memory device). The method presented in FIG. 6 and described below is intended to be illustrative and non-limiting. Although FIG. 6 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 2, the processing depicted in FIG. 6 may be performed by an automated text layout system in cooperation with other elements of a distributed system, as illustrated FIG. 2.

Figure 7:
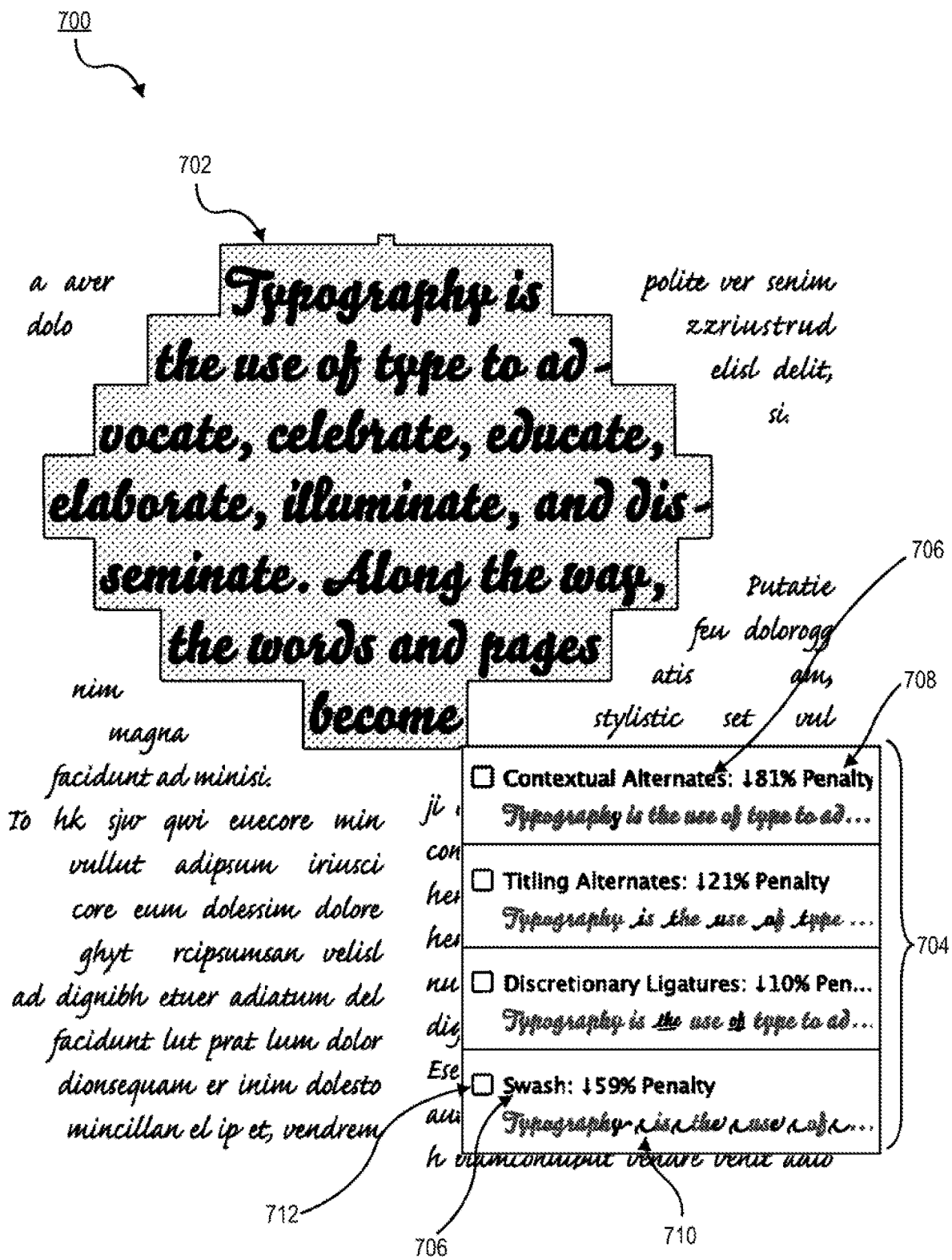
FIG. 7 depicts an example of an interface as used in the process of FIG. 6, according to certain embodiments.

At block 602, the automated text layout system generates, for display on a display device, a menu of font features. The automated text layout system may generate User Interface (UI) elements (e.g., Graphical User Interface (GUI) elements) such as a pop-up window or dialog box to house a list of font features. As described above at block 504, the automated text layout system may identify a set of font features that are applicable to a text region based on parameters such as language used, letters included, and the like. The automated text layout system may render, for display, names of such applicable font features and/or description thereof. FIG. 7 illustrates an example of such a menu of font features 704.

In some embodiments, the automated text layout system may select a subset of available font features for display via the menu of font features. The automated text layout system may, for example, compute improvement metrics for a set of available font features. The automated text layout system may display a font feature in the menu of font features if the first improvement metric exceeds a threshold value. This may involve comparing the computed improvement metric of each font feature to a predetermined threshold value. If the improvement metric of a given font feature exceeds the threshold value, then the automated text layout system displays the font feature in the menu of font features. If the improvement metric of a given font feature does not exceed the threshold value, then the automated text layout system refrains from displaying the font feature in the menu of font features. Accordingly, the automated text layout system can refrain from displaying font features that provide no improvement or a minimal improvement, to improve the user experience and perform the overall process more efficiently.

At block 604, the automated text layout system generates for display, via the menu, supplementary information about one or more font features. The supplementary information may aid a user in discerning what the font feature does. The supplementary information may, for example, be a description of the font feature (e.g., "ligatures combine characters to create a more pleasing layout"). Alternatively, or additionally, the supplementary information may be an example showing what the font feature looks like when applied to text. As a specific example, as illustrated in FIG. 7 and further detailed below, the menu may include a supplementary information 710, such as an indication of what the target text would look like with the font feature applied.

At block 606, the automated text layout system generates for display, via the menu, improvement metrics for the one or more font features. For example, the automated text layout system may generate for display visual representations of the improvement metrics calculated at block 506, described above with respect to FIG. 5. As a specific example, as illustrated in FIG. 7, each of the font features displayed in the menu is displayed with a respective improvement metric 708 associated with the font feature. As shown in FIG. 7, the improvement metric may be shown in the form of a percentage reduction in penalty for each font feature.

At block 608, the automated text layout system receives user input selecting a font feature to apply to the initial text. As indicated in FIG. 7, the menu may further include interface elements to accept user selection of a particular font feature to apply (e.g., checkboxes as shown in 712). A user may select a particular font feature to apply by interacting with the interface element corresponding to the selected font feature. The user may choose a particular font feature based on the displayed improvement metric and/or based on the appearance of the font feature as displayed via the menu. The automated text layout system receives a signal indicating the selected font feature. Responsive to receiving the signal, the automated text layout system may apply the font feature to the initial text, as described above with respect to FIG. 3. Accordingly, in some embodiments, the system allows a user, such as a designer, to customize the font feature(s) applied to text. Alternatively, the system may display all available font features to give the user more options.

Example of an Interface for User Selection of Font Features

FIG. 7 illustrates an example of an interface for user selection of font features, according to some embodiments. FIG. 7 depicts a document 700 which includes initial text 702 and a font feature menu 704.

Document 700 includes several text regions, one of which, initial text 702, has been highlighted via received user input. A user may have highlighted the initial text 702 of interest using a mouse, for example. Initial text 702 appears darkened to indicate that this initial text 702 has been selected.

Font feature menu 704 is further displayed. The font feature menu 704 may be displayed, for example, based on received input from a user, such as right-clicking on a mouse after highlighting initial text 702. As another example, when a text region is highlighted, the system may display an interface element with a label indicating that interaction with the interface element will initiate text improvement operations as described herein (e.g., the letter "O" for OpenType® features, or the phrase "Initiate text improvement").

Font feature menu 704 includes information about four font features which may be applied to the initial text 702. The information about the font features includes the names of the font features 706. As shown in FIG. 7, the names of the font features 706 are Contextual Alternates, Tilting Alternates, Discretionary Ligatures, and Swashes.

For each font feature, the font feature menu 704 further includes an improvement metric 708 for the font feature. As shown in FIG. 7, the improvement metric 708 may be displayed as a percent penalty reduction. For contextual alternates, the displayed improvement metric 708 is an 81% penalty reduction. For tilting alternates, the displayed improvement metric 708 is a 21% penalty reduction. For discretionary ligatures, the displayed improvement metric 708 is a 10% penalty reduction. For swashes, the displayed improvement metric 708 is a 59% penalty reduction.

For each font feature, the font feature menu 704 further includes supplementary information 710 characterizing the font feature. In the example shown in FIG. 7, the supplementary information 710 is a subset of the initial text 702 with the font feature applied (e.g., with contextual alternates applied, with tilting alternates applied, and so forth).

For each font feature, the font feature menu 704 further includes an interface element 712 for selecting the respective font feature. The interface element 712 may, for example, be a checkbox, as shown in FIG. 7. As additional examples, the interface element 712 could be a radio button or the name of the text element itself could be a clickable link. In any event, the interface element 712 is capable of receiving user input selecting a font feature to apply. The automatic text layout system can then use such received user input to select a font feature to apply to the initial text.

In some embodiments, if the user again selects the same text, the font feature menu 704 will again open and show options that can further reduce the penalty value, if any. For example, if the user initially selects the Contextual Alternates font feature to reduce the penalty value by 81%, the font feature menu 704 may automatically update to only show those options that can further improve the penalty. The font feature menu 704 may then indicate that selecting the Swash font feature can further improve the penalty value by 11%. The user may repeat this process until there are no more font features that can further reduce the penalty value.

Example of a Computing System for Modifying Text Layout Using Font Features

Figure 8:
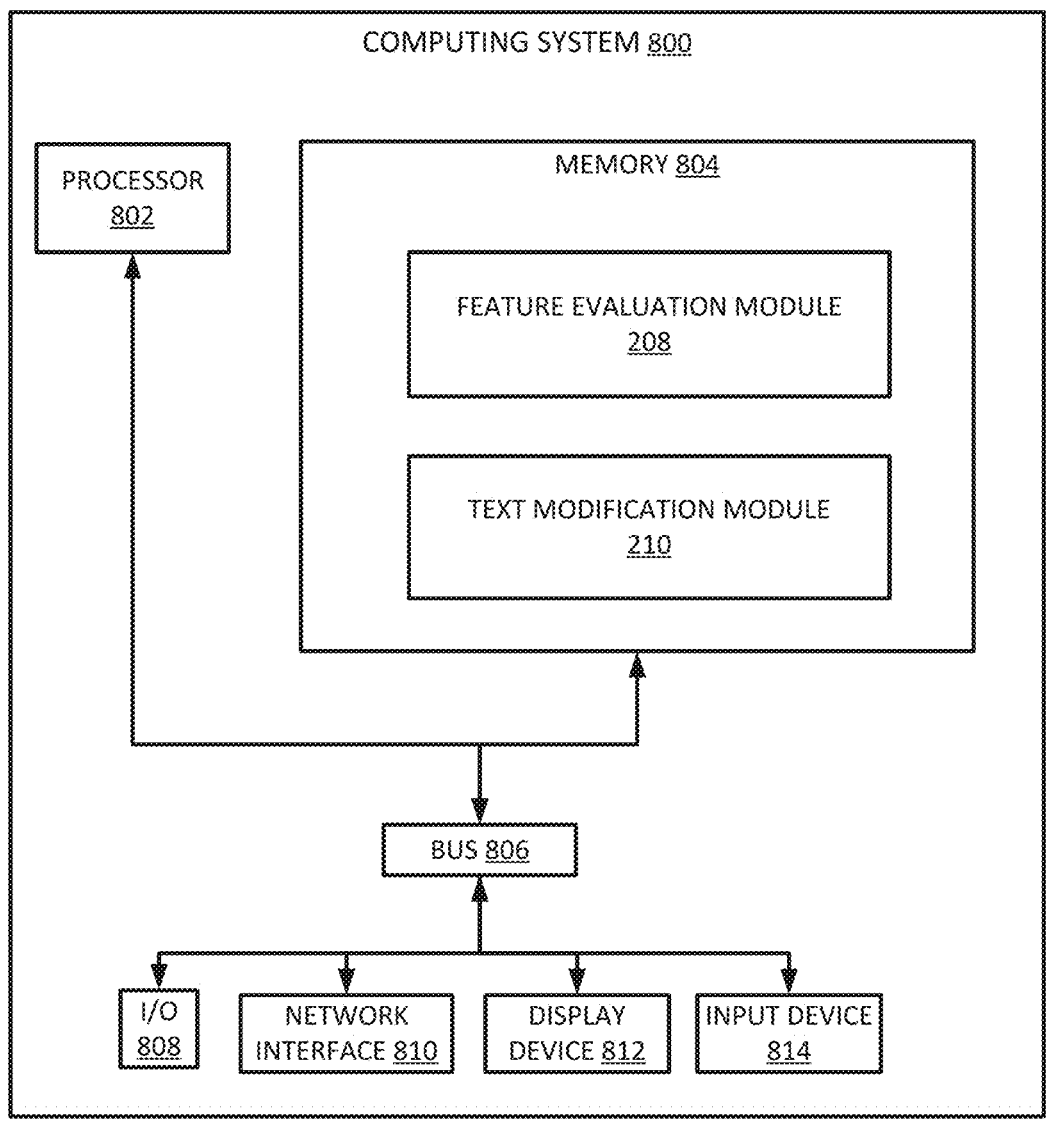
FIG. 8 depicts an example of a computing system that performs certain operations described herein, according to certain embodiments.

Any suitable computing system or group of computing systems can be used for performing the operations described herein. For example, FIG. 8 depicts examples of computing system 800 that executes a feature evaluation module 208. In some embodiments, the computing system 800 also executes a text modification module 210, as depicted in FIG. 8. In other embodiments, a separate computing system having devices similar to those depicted in FIG. 8 (e.g., a processor, a memory, etc.) executes the text modification module 210.

The depicted examples of a computing system 800 includes a processor 802 communicatively coupled to one or more memory devices 804. The processor 802 executes computer-executable program code stored in a memory device 804, accesses information stored in the memory device 804, or both. Examples of the processor 802 include a microprocessor, an application-specific integrated circuit ("ASIC"), a field-programmable gate array ("FPGA"), or any other suitable processing device. The processor 802 can include any number of processing devices, including a single processing device.

The memory device 804 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 800 may also include a number of external or internal devices, such as input or output devices. For example, the computing system 800 is shown with one or more input/output ("I/O") interfaces 808. An I/O interface 808 can receive input from input devices or provide output to output devices. One or more buses 806 are also included in the computing system 800. The bus 806 communicatively couples one or more components of a respective one of the computing system 800.

The computing system 800 executes program code that configures the processor 802 to perform one or more of the operations described herein. The program code includes, for example, the feature evaluation module 208, the text modification module 210, or other suitable applications that perform one or more operations described herein. The program code may be resident in the memory device 804 or any suitable computer-readable medium and may be executed by the processor 802 or any other suitable processor. In some embodiments, both the feature evaluation module 208 and the text modification module 210 are stored in the memory device 804, as depicted in FIG. 8. In additional or alternative embodiments, one or more of the feature evaluation module 208 and the text modification module 210 are stored in different memory devices of different computing systems. In additional or alternative embodiments, the program code described above is stored in one or more other memory devices accessible via a data network.

The computing system 800 can access information such as font features 212 and initial text 206 (as shown in FIG. 2) in any suitable manner. In some embodiments, some or all of one or more of these data sets, models, and functions are stored in the memory device 804, as in the example depicted in FIG. 8. For example, a computing system 800 that executes the feature evaluation module 208 can provide access to the font features 212 by external systems that execute the text modification module 210.

In additional or alternative embodiments, one or more of these data sets, models, and functions are stored in the same memory device (e.g., one of the memory device 804). For example, a common computing system, such as the automated text layout system 202 depicted in FIG. 2, can host the feature evaluation module 208 and the text modification module 210 as well as the font features 212. In additional or alternative embodiments, one or more of the programs, data sets, models, and functions described herein are stored in one or more other memory devices accessible via a data network.

The computing system 800 also includes a network interface device 810. The network interface device 810 includes any device or group of devices suitable for establishing a wired or wireless data connection to one or more data networks. Non-limiting examples of the network interface device 810 include an Ethernet network adapter, a modem, and the like. The computing system 800 is able to communicate with one or more other computing devices via a data network using the network interface device 810.

The computing system 800 also includes a display device 812 and an input device 814. The display device 812 may include a screen for displaying text to a user. The input device 814 may include a keyboard, microphone, touchscreen, and/or the like to receive input from a user, such as initial text and selected font features. Alternatively, or additionally, display device 812 and/or input device 814 may be on a separate computing device that is communicatively coupled to computing system 800.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A computer-implemented method comprising:
   receiving initial text via user selection of a subset of text displayed on a display device;
   responsive to receiving the initial text via the user selection of the subset of the displayed text:

calculating a first improvement metric based on replacing a first glyph with a second glyph, the first improvement metric representing a layout improvement of a first font feature applied to the initial text, wherein the first font feature corresponds to replacing the first glyph with the second glyph; and calculating a second improvement metric representing a layout improvement of a second font feature applied to the initial text:

selecting a subset of a set of available font features based on respective improvement metrics for each font feature of the set of font features, wherein the first font feature is selected based on the first improvement metric exceeding a threshold value and the second font feature is not selected because the second improvement metric is less than the threshold value;

generating, for display on the display device, a menu of font features comprising the selected subset of the set of font features, the menu of font features configured to accept user input selecting one of the font features, the menu including an example showing the second glyph applied to the initial text and the first improvement metric for the first font feature, wherein the second font feature is not displayed in the menu of font features because the second improvement metric is less than the threshold value, the menu of font features comprising a pop-up displayed proximate to and based on the user-selected subset of text;

receiving user input, via the menu of font features, selecting the first font feature for applying to the initial text;

based on the calculated first improvement metric and the user-selected first font feature, applying the first font feature to the initial text to generate updated text;

generating, for display on the display device, the updated text;

receiving user input to tune computation of the improvement metrics; and modifying one or more values used to compute the improvement metrics based on the user input, the one or more values controlling the effect of one or more factors on the improvement metrics, the factors including one or more of hyphenation and line width.

2. The method of claim 1, wherein the first font feature comprises a ligature, and the method further comprises:

applying a third font feature comprising a swash to the initial text based on a third improvement metric, wherein the third improvement metric represents a layout improvement of the third font feature applied to the initial text.

3. The method of claim 1, wherein:

the first improvement metric is further based on line break parameters; and the line break parameters are further applied to the initial text to generate the updated text.

4. The method of claim 1, wherein the first improvement metric is based on a difference between an initial penalty value and a penalty value associated with the first font feature.

5. The method of claim 1, wherein the first font feature is a ligature, a discretionary ligature, a modified fraction, a swash, a tilting alternate, or a contextual ligature.

6. The method of claim 1, wherein:

the first improvement metric is computed based on applying two or more font features to the initial text; and the two or more font features are applied to the initial text to generate the updated text.

7. The method of claim 1, wherein receiving user selection of the subset of the displayed text comprises identifying the subset of the displayed text as highlighted.

8. A computing system comprising:

a processor configured to execute processing comprising:

receiving initial text via user selection of a subset of text displayed on a display device;

responsive to receiving the initial text via the user selection of the subset of the displayed text:

calculating a first improvement metric based on replacing a first glyph with a second glyph, the first improvement metric representing a layout improvement of a first font feature applied to the initial text, wherein the first font feature corresponds to replacing the first glyph with the second glyph; and calculating a second improvement metric representing a layout improvement of a second font feature applied to the initial text;

selecting a subset of a set of available font features based on respective improvement metrics for each font feature of the set of font features, wherein the first font feature is selected based on the first improvement metric exceeding a threshold value and the second font feature is not selected because the second improvement metric is less than the threshold value;

generating, for display on the display device, a menu of font features comprising the selected subset of the set of font features, the menu of font features configured to accept user input selecting one of the font features, the menu including an example showing the second glyph applied to the initial text and the first improvement metric for the first font feature, wherein the second font feature is not displayed in the menu of font features because the second improvement metric is less than the threshold value, the menu of font features comprising a pop-up displayed proximate to and based on the user-selected subset of text;

receiving user input, via the menu of font features, selecting the first font feature for applying to the initial text;

based on the calculated first improvement metric and the user-selected first font feature, applying the first font feature to the initial text to generate updated text;

generating, for display on the display device, the updated text;

receiving user input to tune computation of the improvement metrics; and modifying one or more values used to compute the improvement metrics based on the user input, the one or more values controlling the effect of one or more factors on the improvement metrics, the factors including one or more of hyphenation and line width.

9. The computing system of claim 8, wherein the first font feature comprises a ligature and the processing further comprises:

applying a third font feature comprising a swash to the initial text based on a third improvement metric, wherein the third improvement metric represents a layout improvement of the third font feature applied to the initial text.

10. The computing system of claim 8, wherein:

the first improvement metric is further based on line break parameters; and the line break parameters are further applied to the initial text to generate the updated text.

11. The computing system of claim 8, wherein the first improvement metric is based on a difference between an initial penalty value and a penalty value associated with the first font feature.

12. The computing system of claim 8, wherein the first font feature is a ligature, a discretionary ligature, a modified fraction, a swash, a tilting alternate, or a contextual ligature.

13. The computing system of claim 8, wherein receiving user selection of the subset of the displayed text comprises identifying the subset of the displayed text as highlighted.

14. A non-transitory computer-readable medium having instructions stored thereon, the instructions executable by a processing device to perform operations comprising:
   receiving initial text via user selection of a subset of text displayed on a display device;
   responsive to receiving the initial text via the user selection of the subset of the displayed text:
      calculating a first improvement metric based on replacing a first glyph with a second glyph, the first improvement metric representing a layout improvement of a first font feature applied to the initial text, wherein the first font feature corresponds to replacing the first glyph with the second glyph; and
      calculating a second improvement metric representing a layout improvement of a second font feature applied to the initial text:
   selecting a subset of a set of available font features based on respective improvement metrics for each font feature of the set of font features, wherein the first font feature is selected based on the first improvement metric exceeding a threshold value and the second font feature is not selected because the second improvement metric is less than the threshold value;
   generating, for display on the display device, a menu of font features comprising the selected subset of the set of font features, the menu of font features configured to accept user input selecting one of the font features, the menu including an example showing the second glyph applied to the initial text and the first improvement metric for the first font feature, wherein the second font feature is not displayed in the menu of font features because the second improvement metric is less than the threshold value, the menu of font features comprising a pop-up displayed proximate to and based on the user-selected subset of text;
   receiving user input, via the menu of font features, selecting the first font feature for applying to the initial text;
   based on the calculated first improvement metric and the user-selected first font feature, applying the first font feature to the initial text to generate updated text;
   generating, for display on the display device, the updated text;
   receiving user input to tune computation of the improvement metrics; and
   modifying one or more values used to compute the improvement metrics based on the user input, the one or more values controlling the effect of one or more factors on the improvement metrics, the factors including one or more of hyphenation and line width.

15. The non-transitory computer-readable medium of claim 14, wherein the first font feature comprises a ligature and the operations further comprise:
   applying a third font feature comprising a swash to the initial text based on a third improvement metric, wherein the third improvement metric represents a layout improvement of the third font feature applied to the initial text.

16. The non-transitory computer-readable medium of claim 14, wherein receiving user selection of the subset of the displayed text comprises identifying the subset of the displayed text as highlighted.

* * * * *